(12) United States Patent
Chuberre et al.

(10) Patent No.: US 7,113,741 B2
(45) Date of Patent: Sep. 26, 2006

(54) OPTIMIZED METHOD OF TRANSMITTING MULTIMEDIA CONTENT

(75) Inventors: Nicolas Chuberre, Tournefeuille (FR); Jean Farineau, Levallois Perret (FR); Christophe Nussli, Toulouse (FR)

(73) Assignee: Alcatel, Paris (FR)

( * ) Notice: Subject to any disclaimer, the term of this patent is extended or adjusted under 35 U.S.C. 154(b) by 482 days.

(21) Appl. No.: 10/443,984

(22) Filed: May 23, 2003

(65) Prior Publication Data

US 2003/0220080 A1   Nov. 27, 2003

(30) Foreign Application Priority Data

May 27, 2002   (FR) .................................. 02 06426

(51) Int. Cl.
*H04H 7/00* (2006.01)
(52) U.S. Cl. ................. 455/3.06; 455/3.02; 455/67.13; 455/67.11; 455/186.1; 455/3.04; 455/184.1; 455/228; 704/246; 704/104.1; 704/231
(58) Field of Classification Search ............. 455/186.1, 455/3.02, 3.04, 3.06, 412.1, 418, 419, 228, 455/184.1
See application file for complete search history.

(56) References Cited

U.S. PATENT DOCUMENTS

| | | | |
|---|---|---|---|
| 6,029,195 A | | 2/2000 | Herz |
| 6,137,544 A | * | 10/2000 | Dimitrova et al. .......... 348/700 |
| 6,297,845 B1 | * | 10/2001 | Kuhn et al. ................. 348/192 |
| 6,351,467 B1 | * | 2/2002 | Dillon ......................... 370/432 |
| 6,377,793 B1 | * | 4/2002 | Jenkins ..................... 455/412.1 |
| 6,442,663 B1 | * | 8/2002 | Sun et al. .................... 711/202 |
| 6,694,515 B1 | * | 2/2004 | De Bot et al. .............. 725/105 |
| 6,738,804 B1 | * | 5/2004 | Lo .............................. 709/219 |
| 6,842,761 B1 | * | 1/2005 | Diamond et al. ........ 707/104.1 |
| 6,877,002 B1 | * | 4/2005 | Prince .......................... 707/5 |
| 6,957,041 B1 | * | 10/2005 | Christensen et al. ....... 455/3.06 |

FOREIGN PATENT DOCUMENTS

| | | |
|---|---|---|
| DE | 4440419 A1 | 5/1996 |
| EP | 0817412 A2 | 1/1998 |
| FR | 2809557 A1 | 11/2001 |

OTHER PUBLICATIONS

D. K. Roy et al, "Newscomm: A Hand-Held Interface for Interactive Access to Structured Audio", Common Ground. Chicago '96 Conference Proceedings. Conference on Human Factors in Computing Systems. Vancouver, Apr. 13-18, 1996, pp. 173-180 XP000657816.

* cited by examiner

*Primary Examiner*—Marceau Milord
(74) *Attorney, Agent, or Firm*—Sughrue Mion, PLLC

(57) ABSTRACT

An optimized method for the transmission of multimedia contents between a multimedia content transmitter and a multimedia content receiver in a mobile radio network transmitting a multimedia content description vector from the transmitter to the receiver, calculating a pertinence score of the content from the description vector and as a function of a user profile associated with a user of the receiver, and recovering, at the explicit request of the receiver, a block or blocks of the content not received by the receiver, with a priority depending on the pertinence score associated with the content to which the missing block(s) belong(s).

5 Claims, 4 Drawing Sheets

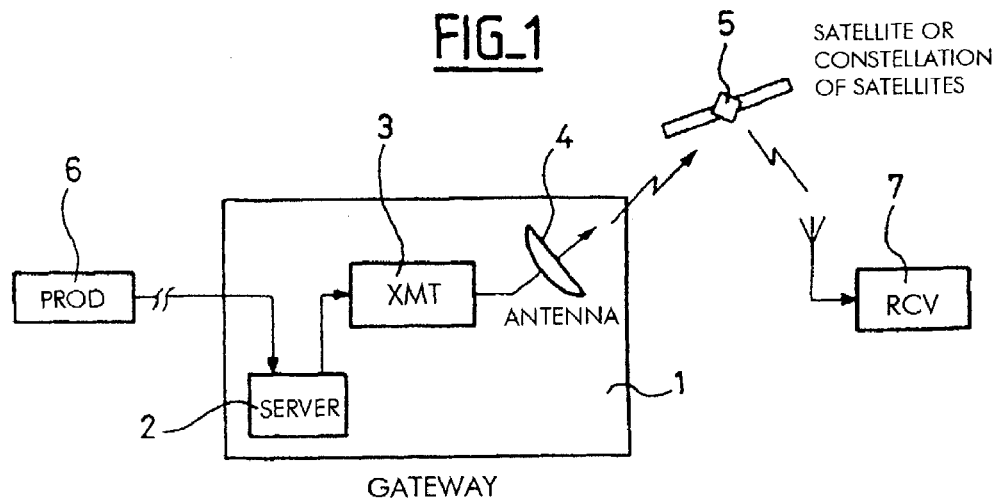
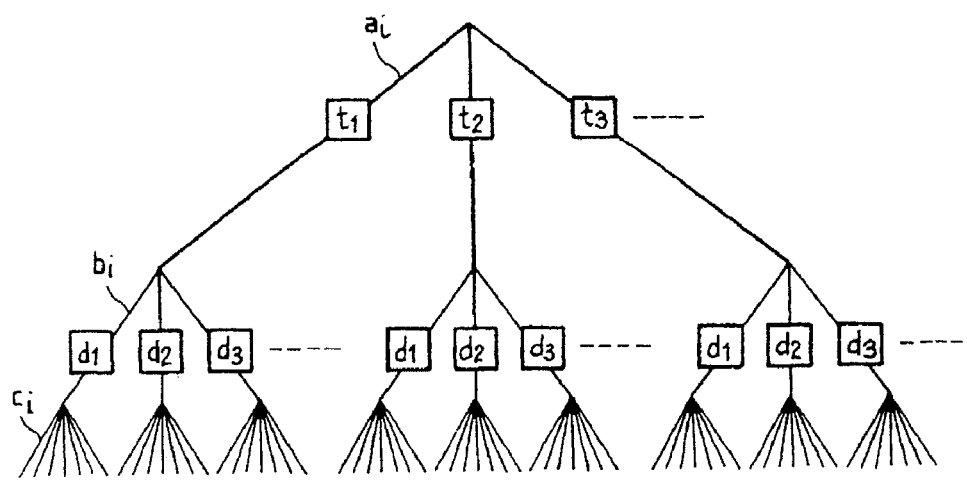

FIG_2
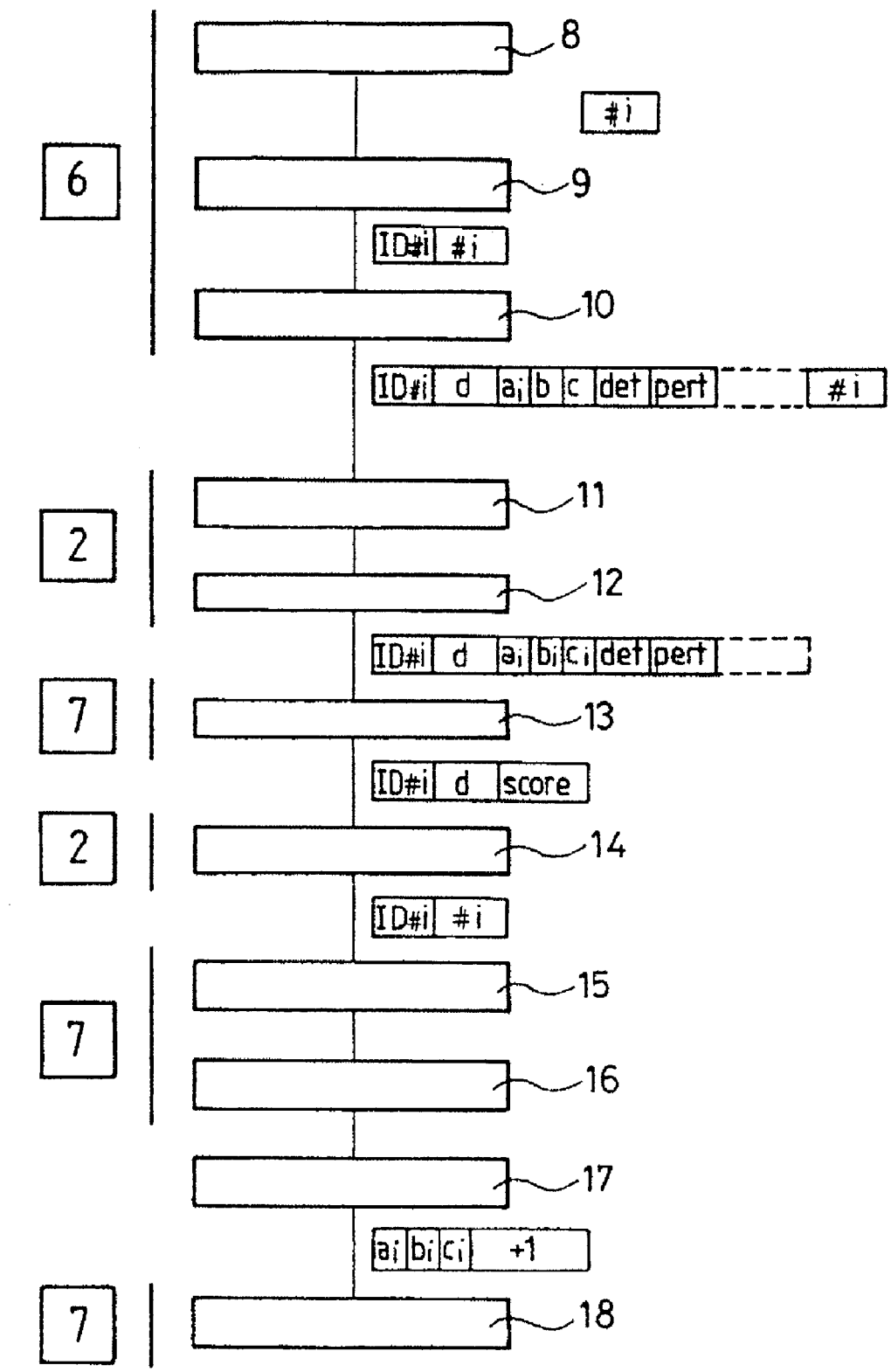

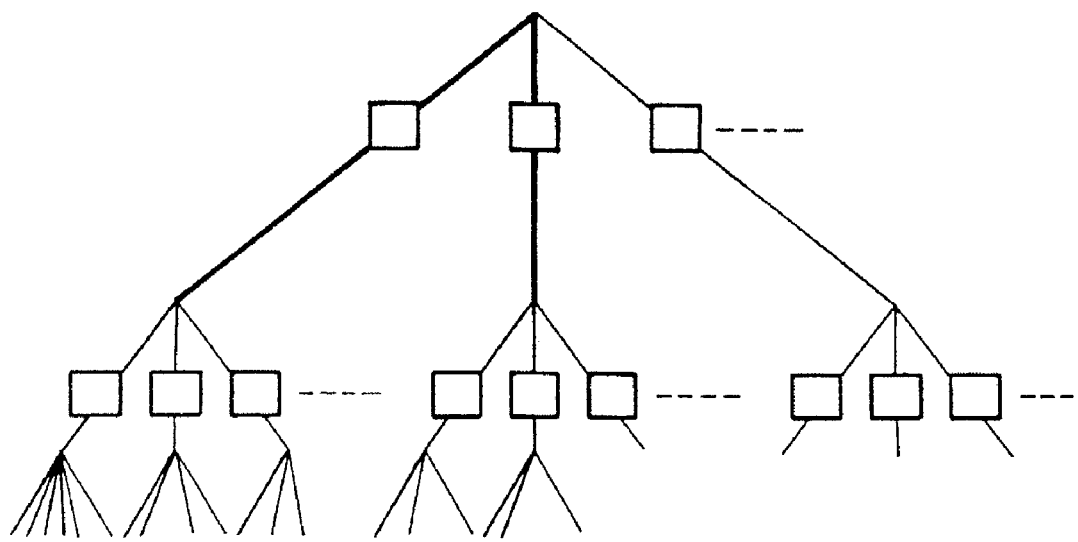
FIG_4
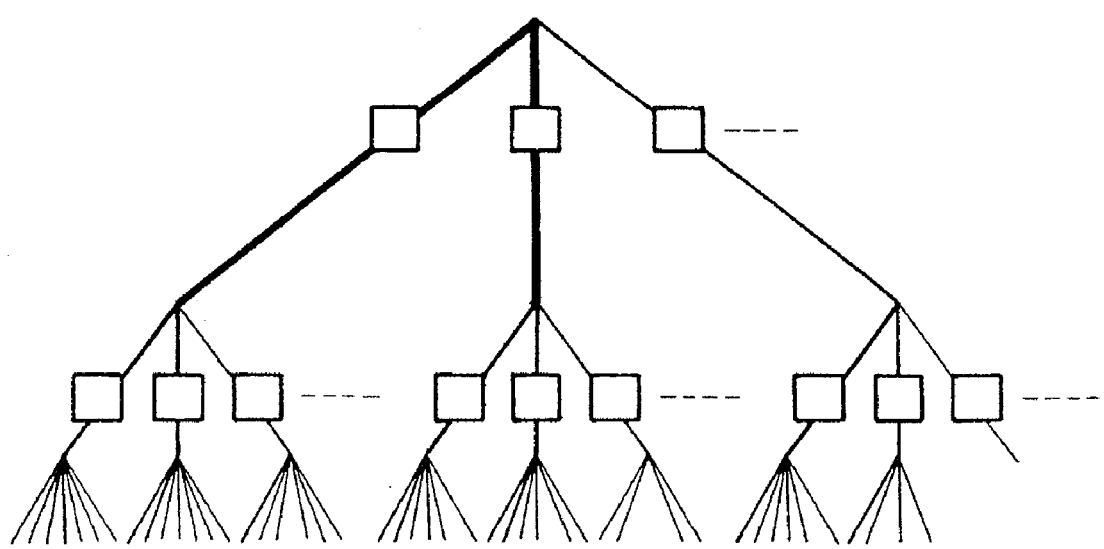
FIG_5

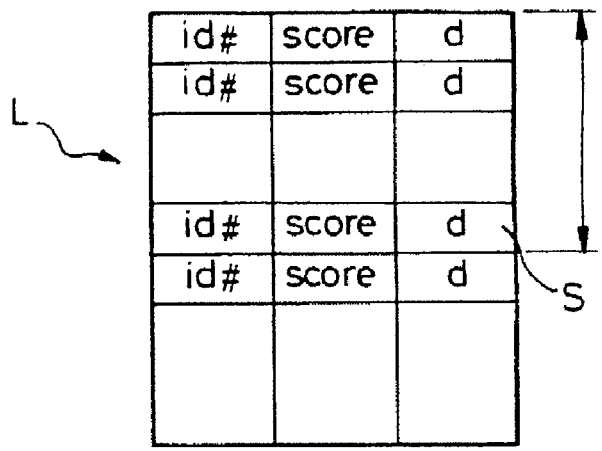
FIG_6
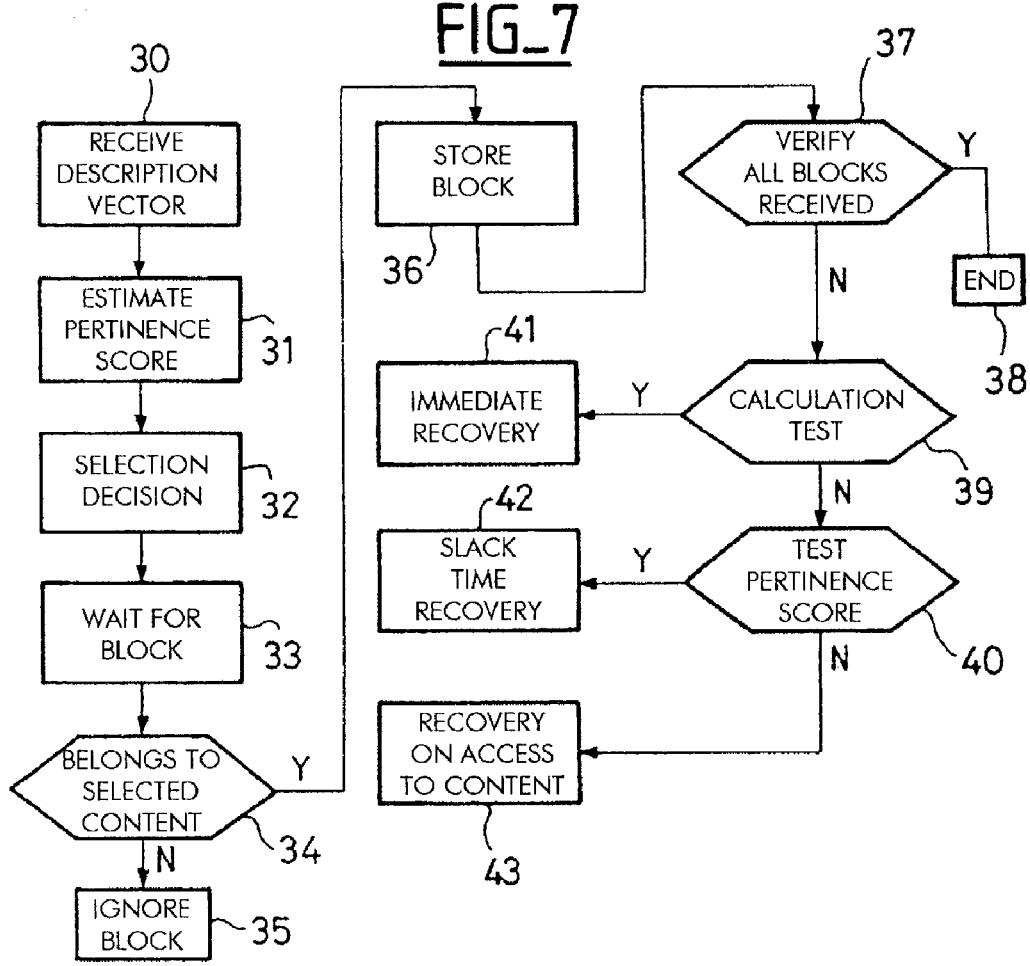
FIG_7

OPTIMIZED METHOD OF TRANSMITTING MULTIMEDIA CONTENT

CROSS-REFERENCE TO RELATED APPLICATIONS

This application is based on French Patent Application No. 02 06 426 filed May 27, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to an optimized method of transmitting news with multimedia content between a multimedia content transmitter and a multimedia content receiver in a mobile radio network.

2. Description of the Prior Art

The above kind of receiver can be connected to a radio broadcast network broadcasting collective news. This system is based on a network of terrestrial transmitters or geosynchronous or non-geosynchronous broadcast satellites, or a combination of broadcast satellites and terrestrial repeaters.

In the present description, the term "collective news" refers to news of interest to some or all users of a mobile radio system.

There are various prior art standards covering mobile telephone systems and architectures. They include the Global System for Mobile communications (GSM) and the more recent third generation (3G) standard for mobile transmission at high bit rates, known in Europe as the Universal Mobile Telecommunication System (UMTS). The term "GSM network" includes prior art services and enhancements known as GPRS and GERAN.

In the order in which they are cited above, these standards provide the benefit of increasingly high voice/data transmission bit rates for point-to-point connections (i.e. for a call between two users).

However, until now, few solutions have been offered for broadcasting collective news with multimedia content, for which the above standards are not suitable.

The term "broadcast" is used in the case of undifferentiated broadcasting to the whole of a population of users of a cellular mobile radio network, and the term "multicast" is used when news is addressed to a subset of that population. In the latter case, the subset of the population can be defined by a corresponding subscription, for example.

The Satellite Digital Multimedia Broadcast (SDMB) system for broadcasting to 3G mobile terminals can deliver multimedia content to 3G mobile terminals.

It is based on a geosynchronous satellite broadcasting to Europe a signal compatible with the standardized W-CDMA waveform used in UMTS terrestrial cellular networks. It operates in the IMT2000 satellite bands adjoining the IMT2000 terrestrial bands. To provide coverage in urban and suburban areas, the SDMB system also provides for the deployment of terrestrial repeaters. In the SDMB system, terminals are designed to operate in terrestrial cellular networks and to receive the SDMB satellite signal.

In the present context, the SDMB system cooperates with cellular networks to offer a low-cost multimedia content delivery and routing service with European coverage.

The transport layer of the SDMB system implements:

protection mechanisms to prevent loss of content based on the use of short-term and long-term forward error correction (FEC) techniques known in the art, or even carousel type retransmission, to alleviate transmission errors caused mainly by blocking of the satellite service link when the terminal is masked by an obstacle such as a building, a tree, a tunnel, etc., and reactive protection mechanisms that take account of transmission errors a posteriori; these mechanisms include mechanisms for adjusting the FEC depth and, in the last resort, submitting requests for recovery of content blocks lost during transmission.

The transport layer of the SDMB system uses a combination of the mechanisms previously cited with a bandwidth consumption in the satellite segment and by access to the return channels in the cellular networks that is a function of the required routing guarantee.

In the case of a high routing guarantee and a restricted deployment of terrestrial repeaters, the return channel of a terminal may be heavily accessed by the cellular network. This penalizes one objective of the system, namely reducing transmission cost.

To remedy this problem, it is possible to modify the preventive transport mechanisms by increasing the FEC depth. However, this solution increases the bandwidth consumed to transmit a content.

Another solution is to require lost blocks to be retransmitted only when the user wishes to access the content. However, this loses the benefit of content delivery aimed at statistically reducing the time to access the content.

The present invention aims to solve the above problems.

SUMMARY OF THE INVENTION

To this end, the invention provides an optimized method for the transmission of multimedia contents between a multimedia content transmitter and a multimedia content receiver in a mobile radio network, which method includes the following steps:

a step of transmitting a multimedia content description vector from said transmitter to said receiver, a step of calculating a pertinence score of said content from said description vector and as a function of a user profile associated with a user of said receiver, and a step of recovering, at the explicit request of said receiver, a block or blocks of said content not received by said receiver, with a priority depending on said pertinence score associated with the content to which said missing block(s) belong(s).

Thus the heart of the invention consists in taking account of the pertinence score of a content, based on a profile defined for the user concerned. Thus the higher the pertinence score of a content, the further ahead of time the return channel is accessed to recover any missing blocks.

In one embodiment, the recovery step is started according to the value of the score associated with the content, whereby any value greater than or equal to a first threshold referred to as a maximum score leads to immediate recovery on detection of blocks not received, any value less than the maximum score but greater than or equal to a second threshold referred to as an average score causes the recovery of missing block(s) at preprogrammed times when the load on the network is considered to be less, and any value less than the average score but greater than or equal to a third value referred to as a minimum score leads to missing block recovery only when the user requests access to the content.

In one embodiment, the thresholds are updated dynamically as a function of the degree to which a local memory of the receiver is filled so that the sum of the memory sizes needed to store contents received in the cache memory is less than the capacity of the cache memory.

In one embodiment, the recovery step is initiated only after detection of missing blocks subsequent to an expected period of reception of all blocks relating to the content.

With the aim of explaining the invention better, embodiments of the invention are described next by way of non-limiting example and with reference to the accompanying drawings.

BRIEF DESCRIPTION OF THE DRAWINGS

FIG. 1 is a diagram showing a content broadcasting and receiving system in accordance with the invention.

FIG. 2 is a flowchart showing various steps of a method in accordance with the invention of routing content.

FIGS. 3, 4 and 5 represent a tree structure content classification at various stages in the process of learning the user profile.

FIG. 6 shows a table of content description vectors sorted in order of decreasing interest.

FIG. 7 is a flowchart corresponding to the algorithm used in accordance with the invention to decide on recovering missing blocks.

DETAILED DESCRIPTION OF THE PREFERRED EMBODIMENTS

First of all, on the subject of the user profile stored in the receiver, the receiver may initially contain a standard user profile from which content is initially selected and offered to the local user.

For example, some user profiles can be oriented toward sports or economics news, without specifying selection criteria relating to finer levels of detail within these two fields.

In one particular embodiment, the standard user profile is loaded into the receiver by means of a removable device such as a magnetic strip card, a smart card, or any similar permanent storage means.

A removable device of the above kind used to load the standard user profile can contain the following types of data:
right to access the network,
right to access the broadcast source,
right to permanent or temporary archival storage, as a function of the nature of the news items,
information relating to the duration and extent of the above access and local archival storage rights,
encryption/decryption keys for exchanging information with the broadcast source, and
available user profiles in the case of a multiplicity of standard user profiles.

In one particular embodiment, the profile of each user is constructed incrementally and implicitly from a standard profile as a function of the nature of contents consulted by the user and chosen from the contents selected by the receiver, the nature of such access by the user—complete reading, partial reading, skipping directly to the next news content—enabling updating of the profile that the receiver associates with the user, namely, and respectively, incrementing, leaving unchanged, and decrementing the level of interest associated with the content class concerned.

The user profile as updated during access by the user can be transferred to a removable medium such as a magnetic stripe card, a smart card, or any similar permanent storage means, so that it can be re-used in another receiver.

Generally speaking, the receiver uses profile acquisition mechanisms to filter multimedia contents broadcast continuously by the gateway. These mechanisms can also be used to characterize the audience and modulate the content charging structure.

Profile acquisition can be:
manual and declarative, with the user declaring his own profile,
automatic, employing dynamic learning based on processing the multimedia contents received as described in French patent application No. 00 06 691 filed on 25 May 2000,
a combination of the previous two modes, namely declarative and automatic, to accelerate the process of learning fundamental characteristics of the user.

Thus the profile reflects the interests of the user and the context of use.

Interests, which can be classified in a tree structure, can include, for example, and as already mentioned: music, cinema, sport, politics, local culture.

The context of use reflects to some extent the behavior of the user and his environment.

One way to refine the context is to distinguish between the short-term context and the long-term context.

For example, the short-term context is qualified by the date and time of day and geographical location.

On the other hand, the long-term context could be characterized by:
the mobility of the receiver, which can be defined by the distance traveled and the radius within which the receiver moves around,
the times at which the receiver is used,
the type of receiver, namely its multimedia capacities and its cache memory site.

Socio-cultural information based on the language of the user, their age, etc., can also be added.

Note that, notwithstanding the accessibility of most of the above information, acquiring some of that information is subject to restrictions. Thus the geographical position and mobility necessitate connecting the receiver to a Global Navigation Satellite System (GNSS) location module or require the cellular network to provide the coordinates of the receiver and means for the receiver to interpret those coordinates.

Filtering could exploit the known context of the user to refine targeting. A very mobile user who is a "night owl" will not necessarily be receptive to the some news items as a sedentary user in a large town.

The receiver is integrated into a system like that shown in FIG. 1. The system includes a hardware infrastructure consisting of a gateway 1, i.e. a system comprising a broadcast server 2, a transmission system 3, and an antenna 4. The infrastructure also includes a satellite 5 (or a constellation of satellites) adapted to forward signals received from the transmission system to receivers 7 in a given region or over the whole of the planet. There is no limit on the number of receivers 7 in the region covered by the satellite(s). FIG. 1 shows only one receiver 7. Note that the connection between the gateway and the receiver does not have to pass through the satellite(s), and can be provided exclusively by terrestrial relay stations, not shown.

The system processes news content in the following manner.

Initially, the content is produced by a production unit 6.

For easier understanding, the remainder of the description is based on content constituting radio programs, hereinafter referred to as "transmissions".

The transmissions are classified by the production unit and are then stored in the broadcast server 2, which transmits them to the satellite(s) 5 at the times of best availability of the network.

Obviously there are periods of lower use of the network, in particular between 0000 and 0800.

FIG. 2, in which each block 8 to 18 corresponds to one of the following steps, shows the processing of the content in more detail.

Steps 8, 9: The production unit broadcasts the transmissions [#i] to which identifiers [ID#i] are assigned. Each transmission or content is segmented into a number of blocks for adaptation to the transport layer.

Step 10: A transmission description vector is generated for each transmission. The description vector includes parameters that are used to optimize the use of the transmission resources of the system and to filter the most pertinent content in the receiver.

This vector includes:
the identifier of the content (the transmission) [ID#i],
the duration [d] of the transmission (for audio and video content), and
an indication of the classification of the transmission [$a_i$, $b_i$, $c_i$]; the classification tree can use the Dewey Decimal Classification (DDC), for example, as used by the American Library of Congress, and covering all fields of knowledge; there is of course provision for other models that are more appropriate to identifying multimedia content,
the level of detail [det] representative of processing of the news,
a pertinence mark [pert] for the classification of the transmission,
the size of the expected audience: geographical area, multicast group, etc.,
the priority associated with the content: urgent, at a guaranteed time, as soon as possible, etc.,
content delivery quality: very important, important, best normal, best effort,
the size of the content,
the content type and encoding type (standards such as Windows™, Real Time™ players): speech, audio, text, data, low resolution video, high resolution video,
the language (the S-DMB system covers the whole of Europe),
the encryption type: unencrypted or encrypted content,
the tolerance threshold: percentage of errors tolerated for acceptable operation,
the content expiry date,
an indication of intellectual property or copyright rights,
the ownership/source of the content, etc.

Finally, the program element [#i] as such is generated.

In the present example, classifying the transmission entails positioning it in a tree structure like that shown in FIGS. 3, 4 and 5.

The classification structure used in this example comprises three tree levels.

At the root level, the tree unites all types of programs likely to constitute radio transmissions.

FIG. 3 shows three branches corresponding to this first tree level. Each branch $t_1$, $t_2$, $t_3$ corresponds to a particular type of program, for example: news transmissions, cultural transmissions, music programming.

At the second tree level, each program type $t_1$, $t_2$, $t_3$ is divided into domains, of which three domains $d_1$, $d_2$, $d_3$ are shown here.

Three domains may be considered within the news transmission program type, for example: political news, sports news, cultural news.

Each news domain is in turn divided into sectors, which constitute a third tree level.

As shown in FIG. 2, the classification of a transmission by its position within the classification structure is in this instance expressed by a pointer consisting of three references $a_i$, $b_i$, $c_i$, each of which corresponds to a tree level.

The classification within the structure is associated with the level of detail indication representative of the degree of detail with which the news content is processed, for example from 1 for a summary to 3 for a very detailed analysis, and the pertinence mark, qualifying the interest accorded to the content concerned within the class concerned.

Step 11: All the programs stored in this way and their description vectors are stored in the gateway 1 for broadcasting via the satellite(s) 5.

Step 12: Only the description vectors defined above are broadcast. They specify the characteristics of the content to be broadcast.

Step 13: Each receiver or user terminal receives the description vectors and extracts statistical data representative of the number of times and for how long the user has already accessed the class concerned. For this it uses the pointer [$a_i$, $b_i$, $c_i$] supplied by the description vector to access the statistical table constructed by the receiver. This table may not show the three levels for the branch concerned, especially for branches that are little used by the user or in the early stages of the learning process, during initial use of the device by the user; the evaluation is then based on the lower level access statistics [$a_i$, $b_i$], or even [$a_i$], weighted by the tree level difference.

This results in an evaluation of the content, consisting of a plurality of statistical values in the case of a multiple description vector (where several classes are relevant); in this case, the statistical value retained is the highest value, after weighting by the pertinence mark. The resulting weighted statistical value is referred to as the score of the content.

Each score represents the interest that the user might show in the transmission conveying the content concerned, based on his user profile.

Consequently, the process of evaluating a content entails taking account of the weight of the content, as a function of the branch to which the content belongs (which is identified in the description vector), which weight can be supplied by a table listing the correspondences between weights and addresses of the content in the tree, and the pertinence factor or mark of the content specified in the description vector (between 0.1 and 10, with 1 as the standard value). The score is obtained from the following formula, in which $w_{i,j,k}$ represents the weight of the content:

content pertinence score=$w_{i,j,k}$ content pertinence.

The description vectors are then sorted in decreasing score order, as shown in FIG. 6.

A threshold S is determined in the receiver, expressing the storage capacity reserved in the receiver for the transmissions received.

In FIG. 6, the durations of the various transmissions sorted in decreasing score order are summed for each table.

Selecting transmissions consists of retaining, in decreasing score order, those for which the sum of the durations can be accommodated by the available storage capacity, as defined by the threshold S.

Once the list L of transmissions to be retained has been established, the receiver is ready to receive the transmissions.

The subsequent reception of description vectors, associated for example with recent news contents (latest news), is taken into account by the same process, any contents already stored being overwritten by contents having a higher score.

Step 14: The transmissions are broadcast in the form of transmission blocks to all the receivers. A transmission comprises a plurality of blocks, or one block in the case of a very short transmission, of course. The satellite(s) 5 broadcast(s) each of the transmissions produced by the production units in the form of said blocks throughout the coverage area.

Step 15: Each receiver stores locally the transmissions whose description vectors it has previously selected.

Step 16: When all the transmissions have been broadcast, each receiver contains a customized program determined by its user profile. To ensure some consistency in the presentation of the contents to the user, the transmissions are sequenced for the consultation phase as a function of criteria that can be defined by the production units or by the user as a function of his preferences: simply by domain and by decreasing score within the domain concerned.

Step 17: The user can then consult the transmissions stored locally in the receiver. Each transmission is presented to the user via a suitable interface described hereinafter, enabling the user to move from one transmission to another and to select a required transmission for execution.

Consequently, it is clear that, in the spirit of the foregoing disclosure, the higher the pertinence score associated with a received content, the greater the benefit of saving that content in the cache memory of the receiver. On the other hand, a content with a low score is more readily deleted because the chance of it interesting the user is low.

It will be noted that the description vector is transmitted on a strongly protected channel in order to offer the greatest guarantee of routing to users.

The problem more particularly addressed by the invention is explained next. Of the contents selected to be retained in memory, some will be only partially received. This partial reception of contents is usually caused by obstruction of the downlink to the receiver (satellite-receiver link or terrestrial station-receiver link) by a physical obstacle (buildings, etc.). Under these conditions, the transmission of these contents will be adversely affected by non-reception of some of the blocks constituting them.

To remedy the problem referred to above, the invention uses the return channel (satellite or terrestrial link) to recover the missing blocks by way of individual access to the content broadcast server.

In accordance with the invention, instead of instigating individual access via the return channel automatically as soon as a block is missing, recovery priority depends on the pertinence score associated with the content to which the missing block belongs.

Accordingly, depending on the scores of the selected contents, recovery is effected:
  immediately, for a high score,
  during slack times of the terrestrial cellular network, for a medium score; obviously the cost of broadcasting via the gateway can be greatly reduced by the general broadcasting of all contents at times when the network is less used, so that the user no longer has to support the high cost of a long connection during peak periods and the network operator can profitably use the infrastructure at slack times, or
  when access to the content is requested, for a low score; if a content has a low pertinence score, this represents a low statistical interest of the user in it and missing blocks are therefore recovered when the user consults the associated content.

The FIG. 7 flowchart represents this way of recovering missing blocks in accordance with the invention using a missing block recovery decision algorithm.

FIG. 7 shows a first step 30 of receiving a description vector associated with a particular content.

This step is followed by a step 31 for estimating the pertinence score of the content, followed by a selection decision step 32 based on the criteria mentioned above.

A step 33 of waiting for the downlink block associated with the vector continues until the latter is received.

A first test 34 then determines if the block received belongs to the selected content.

If not, the test leads to no action on the block concerned (event 35).

On the other hand, if the block does belong to a selected content, the next step is a step 36 for storing the block with any other blocks already stored.

Step 36 is followed by a test 37 to verify reception of all blocks corresponding to the content concerning i during the theoretical transmission time d. The transmission time includes the FEC phase and any redundant retransmissions.

If the test result is positive, the algorithm terminates (step 38) because there are no missing blocks and thus no recovery is needed.

On the other hand, if the test result is negative, a calculation test 39 is performed. If the pertinence score for the content #i is greater than or equal to the immediate recovery decision threshold, a step 41 for immediate recovery of the missing blocks is started.

On the other hand, if the pertinence score for the content #i is less than the immediate recovery decision threshold, another test 40 is performed which compares the pertinence score to the low load decision threshold corresponding to recovery during cellular network slack times. If the pertinence score for the content #i is greater than or equal to the threshold for the slack time recovery decision, a step 42 for recovery during slack times is started.

However, if the pertinence score for the content #i is less than the threshold for the slack time recovery decision, recovery is effected only by way of an event 43 (block recovery when the content is requested by the user).

It will be noted that the above algorithm is implemented in the software of the receiver and that the receiver includes appropriate means for extracting, interpreting and processing the description vector.

As previously explained, a plurality of decision thresholds are identified, corresponding to:
  selection of the content for retention in the local cache,
  immediate recovery of missing blocks,
  recovery during cellular network slack times,
  recovery when the user accesses the content.

The above thresholds can be updated dynamically as a function of various parameters:
  the degree to which the local memory of the terminal is filled,
  the pertinence score of contents in the cache (average, max, min, breakdown), the storage time relative to the reception date and expiry date of the contents.

Thus decisions are taken by comparing the pertinence score of the content to the above thresholds.

It will be noted that the selection decision can be accompanied by overwriting some of the stored contents.

It will also be noted that the optimized transmission method can be implemented entirely in software in the transmitter and in the receiver.

Thus the method in accordance with the invention of recovering missing blocks and the receiver incorporating means for implementing that method have advantages including:
- bandwidth reduction: this method reduces the number of individual recovery operations via the terrestrial network for a given level of protection on the satellite segment; the bandwidth reduction can apply to the satellite segment in that it is possible to adjust the protection level on the satellite segment for a required volume of individual recovery operations;
- user transparency: the access time to the contents selected for placing in the cache remains statistically unchanged;
- it provides a simple way of obtaining information on the audience for some contents without intruding on the privacy of the user; information on the interest of each user in the contents transmitted is obtained simply by analyzing missing block recovery access.

The embodiments described above are not limiting on the invention. They are provided to explain the invention, the scope of the invention being defined by the appended claims.

In particular, any decision element can be envisaged for characterizing the user profile.

The mobile radio network in which the invention is implemented can be a terrestrial network (i.e. including only terrestrial stations) and/or a satellite network.

It will be noted that the decision thresholds according to the invention can be separate or coincident.

The invention claimed is:

1. An optimized method for the transmission of multimedia contents between a multimedia content transmitter and a multimedia content receiver in a mobile radio network, which method includes the following steps:
   - a step of transmitting a multimedia content description vector from said transmitter to said receiver,
   - a step of calculating a pertinence score of said content from said description vector and as a function of a user profile associated with a user of said receiver, and
   - a step of recovering, at the explicit request of said receiver, a block or blocks of said content not received by said receiver, with a priority depending on said pertinence score associated with the content to which said missing block(s) belong(s).

2. The method claimed in claim 1 wherein said recovery step is started according to the value of said score associated with said content, whereby any value greater than or equal to a first threshold referred to as a maximum score leads to immediate recovery on detection of blocks not received, any value less than said maximum score but greater than or equal to a second threshold referred to as an average score causes the recovery of missing block(s) at preprogrammed times when the load on said network is considered to be less, and any value less than said average score but greater than or equal to a third value referred to as a minimum score leads to missing block recovery only when said user requests access to said content.

3. The method claimed in claim 2 wherein said thresholds are updated dynamically as a function of the degree to which a local memory of said receiver is filled so that the sum of the memory sizes needed to store contents received in said cache memory is less than the capacity of said cache memory.

4. The method claimed in claim 1 wherein said recovery step is initiated only after detection of missing blocks subsequent to an expected period of reception of all blocks relating to said content.

5. The method claimed in claim 1 wherein said user profile reflecting interests of said user of said receiver is updated automatically on the basis of access by said user to received contents.

* * * * *